United States Patent
Wells et al.

(10) Patent No.: US 8,834,970 B2
(45) Date of Patent: Sep. 16, 2014

(54) METHOD AND COMPOSITION FOR ENHANCING THE CURE OF RESIN-BASED COATINGS

(75) Inventors: James R. Wells, Gahanna, OH (US); Michael J. Mettille, Newark, OH (US)

(73) Assignee: Tremco Barrier Solutions, Inc., Reynoldsburg, OH (US)

( * ) Notice: Subject to any disclaimer, the term of this patent is extended or adjusted under 35 U.S.C. 154(b) by 984 days.

(21) Appl. No.: 11/588,077

(22) Filed: Oct. 26, 2006

(65) Prior Publication Data
US 2008/0099721 A1 May 1, 2008

(51) Int. Cl.
*B05D 3/02* (2006.01)
*C09D 5/02* (2006.01)
*C09D 11/54* (2014.01)

(52) U.S. Cl.
CPC ............... *C09D 5/024* (2013.01); *C09D 11/54* (2013.01)
USPC .............. 427/385.5; 252/182.13; 252/182.14; 252/182.17; 252/182.18; 252/182.28; 427/333; 427/339; 427/340

(58) Field of Classification Search
USPC ............... 427/333, 339, 340, 385.5; 524/104, 524/233, 361, 364, 365, 376, 379, 386, 388, 524/560, 561, 562; 252/182.13, 182.14, 252/182.17, 182.18, 182.28
See application file for complete search history.

(56) References Cited

U.S. PATENT DOCUMENTS

| | | | | |
|---|---|---|---|---|
| 2,416,232 | A * | 2/1947 | Soday | 427/341 |
| 3,752,783 | A * | 8/1973 | Iwantani | 524/195 |
| 4,761,312 | A * | 8/1988 | Koshi et al. | 427/387 |
| 5,672,279 | A | 9/1997 | Sargent et al. | |
| 6,123,934 | A * | 9/2000 | Koyama et al. | 424/70.11 |
| 6,503,962 | B1 * | 1/2003 | Mouri et al. | 523/102 |
| 2002/0151644 | A1 * | 10/2002 | Williams et al. | 524/801 |
| 2004/0058202 | A1 * | 3/2004 | Payne et al. | 428/704 |

FOREIGN PATENT DOCUMENTS

GB 1443173 7/1976

OTHER PUBLICATIONS

Taixing Water Chemical Co., Ltd., product information for glycolic acid from website http://water.en.alibaba.com/offerdetail/51281264/Sell_Glycolic_Acid.html, 2005.
Ebbing, D.D. et al., "General Chemistry, Second Edition," 1987, p. 327, Houghton Mifflin Co., Boston, MA.
"CRC Handbook of Chemistry and Physics," 72nd Ed., 1992, pp. 8-37 through 8-39, CRC Press.

* cited by examiner

*Primary Examiner* — David W Wu
*Assistant Examiner* — Marie Reddick
(74) *Attorney, Agent, or Firm* — Calfee, Halter & Griswold LLP

(57) ABSTRACT

Preliminary cure of an aqueous acrylic weatherproofing emulsion coating is accelerated by contacting the coating with urea hydrochloride dissolved in water or an organic solvent at least partially miscible with water.

25 Claims, No Drawings

METHOD AND COMPOSITION FOR ENHANCING THE CURE OF RESIN-BASED COATINGS

BACKGROUND

To insulate the foundations of new homes, new thermal and moisture-insulating systems have been developed. In one such system, high-density fiberglass boards or sheets are attached to the foundation and then coated with a high solids, relatively viscous aqueous acrylic emulsion-based coating. Upon drying, the acrylic emulsion-based coating forms a cured, relatively thick (e.g. 40 mils, ~1 mm) acrylic resin layer or coating.

In cold or humid weather, preliminary cure of such acrylic resin coatings, i.e., drying and curing of the coating enough to resist degradation by rain ("wash off") or physical contact ("brush off"), can take two days or longer. Acrylic emulsions are commonly stabilized with anionic surfactants, which are rendered ineffective when pH drops below about 7. Accordingly, it has already been proposed to speed preliminary cure by contacting the still-wet coating with dilute aqueous hydrochloric acid. This causes the emulsion at the surface of the coating to break and a solidified "skin" of acrylic resin to form at this surface, this "skin" being strong and stable enough to prevent wash off and brush off of the remainder of the still-wet and uncured coating.

Although effective, HCl treatments are problematic because noxious HCl gas is liberated when the HCl treating solution evaporates. Therefore, there is a need for a new treatment system which eliminates this problem and, preferably, provides a stronger resin "skin" during preliminary cure.

SUMMARY

According to this invention, it has been found that a treating composition comprising urea hydrochloride or its analog dissolved in water, or an organic solvent miscible with water, not only accelerates preliminary cure of such acrylic emulsion coatings but also creates a thicker and tougher resin skin on the still-wet emulsion coating.

Thus, the present invention provides a process for accelerating preliminary cure of an aqueous polymer resin emulsion coating, the process comprising contacting the coating with a treating composition comprising urea hydrochloride or its analog dissolved in a liquid vehicle comprising an organic solvent at least partially miscible with water, water or both.

In addition, the present invention also provides a new treating composition for use in accelerating preliminary cure of aqueous polymer resin emulsion coatings comprising urea hydrochloride or its analog dissolved in a liquid vehicle comprising an organic solvent at least partially miscible with water.

DETAILED DESCRIPTION

Weatherproofing Emulsion Coating

The primary focus of this disclosure is on accelerating preliminary cure of weatherproofing emulsion coatings. In this context, a "weatherproofing emulsion coating" will be understood to mean the cured coating formed when an aqueous coating composition containing an emulsified polymer resin whose primary use is in providing moisture resistant coatings for foundations and other structural members in the building industry is applied to a substrate and dried. In addition, "preliminary cure" of such a weatherproofing emulsion coating will be understood to mean enough drying and curing of the weatherproofing emulsion used to form this cured coating, after this weatherproofing emulsion is applied to a substrate but before it has fully dried and cured, so that it resists degradation by rain ("wash off") and by physical contact ("brush off"). See, Paragraph [0002] above. Such weatherproofing emulsion coating compositions are water-based and typically contain about 10 to 80 wt. %, more typically about 40 to 75 wt. %, and even about 60 to 70 wt. % solids, including an emulsified polymer resin, and normally have viscosities on the order of about 500 to 30,000 cps, more typically about 2,000 to 20,000 cps and even about 7,500 to 16,000 cps. Such weatherproofing emulsion coating compositions typically contain about 10 to 50 wt. % polymer solids, depending on the other ingredients present.

These weatherproofing emulsion coating compositions normally contain, in addition to one or more emulsified polymer resins, additional ingredients such as coalescing solvents, mineral fillers, preservatives, primary color pigments, surfactants, cotton and/or other cellulosic fibers, as well as variety of other materials and are formulated so that they form continuous cured coatings on the order of 10-80 mils (~0.25-2 mm) thick when applied by conventional spray equipment. They differ from conventional acrylic house paints which are normally formulated to form continuous cured coatings on the order of 2 to 10 mils thick whether applied by brush or spray.

These weatherproofing emulsion coating compositions are normally based on acrylic resins which, as well-known, are typically composed of polymers and copolymers of $C_1$-$C_{12}$ alkyl (meth)acrylates, more typically $C_1$-$C_4$ alkyl (meth)acrylates and especially methyl methacrylate. In this context, "(meth)acrylate" means acrylate, methacrylate or both. Copolymers of such alkyl (meth)acrylates can be composed of two or more of these alkyl (meth)acrylates and can also contain up to about 50 wt. %, more typically up to about 20 wt. % of one or more additional copolymerizable monomers such as ethylene, propylene and other mono-unsaturated hydrocarbons having up to 12 carbon atoms, vinyl monomers such as vinyl chloride, styrene, α-methyl styrene and other vinyl aromatics containing no more than about 12 carbon atoms, butadiene, isoprene and other multifunctional vinyl monomers.

As indicated above, such weatherproofing emulsion coating compositions can be used together with insulating materials such as boards or sheets formed from high-density fiberglass, polystyrene, polyisocyanurates, etc. to form insulating and weatherproofing barriers on foundations and other building structural members. For this purpose, the insulating boards or sheets are first attached to the foundation or other structural member by conventional means and then the weatherproofing emulsion coating composition is sprayed on these boards or sheets. Because the insulating board or sheet is normally porous, a first portion of this emulsion migrates into the interstices in the substrate, i.e. the pores or spaces in the material. Additional amounts of applied emulsion coating composition then form a self-supporting layer of substantial thickness, e.g., 10-80 mils (~0.25-2 mm), where the emulsion coating composition remains until its volatile content evaporates and the emulsified particles therein coalesce with one another and then cure to form a solid polymer coating.

Because coatings of this type are so thick, drying and curing does not occur throughout the entire thickness of the coating layer at the same time. Rather, drying and curing begins at the exposed or outside surface of the coating and then proceeds down to its base where the coating is attached to its fiberglass or other substrate. Some curing may also begin at the base of the coating, where it is attached to its substrate, in which case curing proceeds from both sides of the coating towards its middle. In any event, until drying and curing is complete, the coating can be viewed as having an outer "skin" where the polymer particles have already coalesced and cured and an inner core composed of still-wet emulsion coating.

This outer skin, when first formed, may be too thin to prevent wash off and brush off of the coating. After a suitable time, however, this outer skin does become thick enough and strong enough for this purpose, which is referred to herein as "preliminary cure." Because preliminary cure can take as long as two days or longer when the weather is cold or rainy, prior attempts have been made to accelerate preliminary cure through the application of aqueous HCl. This causes polymer emulsions stabilized with anionic surfactants to break and therefore accelerates coalescence and curing of the polymer particles affected by the acid. However as indicated above, aqueous HCl is undesirable to use because the HCl in the treating solution is liberated into the atmosphere where it may represent a safety and environmental problem.

Urea Hydrochloride and its Analogs

Urea hydrochloride is an organic salt that acts like an acid. It can be formed with any desired ratio of urea and hydrochloric acid that performs the desired function. Examples of suitable salts include those formed by combining urea with hydrochloric acid in molar ratios between about 1:4 and 4:1, more typically between about 1:2 and 2:1, and even between about 1.5:1 and 1:1.5. Urea hydrochloride in which the molar ratio of urea to hydrochloric acid is about 1:1 is especially interesting.

Urea is weakly-basic and forms salts with strong acids. Urea hydrochloride is a salt formed by mixing urea with hydrochloric acid. Common urea hydrochloride salts include the 1:1 urea to hydrochloric acid salt (CAS 506-89-8), and the 1:2 urea to hydrochloric acid salt. Urea hydrochloride is commercially available from a wide variety of sources. Urea hydrochloride with any desired ratio of urea to hydrochloric acid can be prepared by simply mixing these components in the desired ratios, typically in water.

In addition to urea hydrochloride, urea hydrochloride analogs can also be used in this invention. For this purpose, salts of any strong acid with urea or other weak base can be used in place of urea hydrochloride. In this context, a "strong" acid is an acid which ionizes in water completely or essentially completely. Meanwhile, a "weak" base is a base which only partly ionizes in water. See, Ebbing, D. D., and Wrighton, M. S., "General Chemistry, Second Edition," Houghton Mifflin Company, Boston, pp. 327 (1987).

Examples of suitable strong acids that can be used for this purpose include mineral acids such as nitric, hydrochloric, hydrobromic, hydroiodic, hydrofluoric, and others. Some acids commonly considered "weak" acids are also suitable, including but not limited to formic, acetic, hydroxyacetic, and thioglycolic acids.

Examples of suitable weak bases that can be used for making the urea hydrochloride analogs of this invention include alkanolamines including triethanolamine, diethanolamine, monoethanolamine and HO-[(alkyl)O]$_x$—CH$_2$)$_y$NH$_2$ where x is 1-8 and y is 1 to 40; alkylamines (including methylamine, ethylamine, propylamine and butylamine); dialkylamines; trialkylamines; alkyldiamines (including ethylenediamine); alkyltriamines; alkyltetramines; and polymers with amino or (alkyl or aryl)amino substituent groups, including (mono or di)-alkylaminoalkylacrylate, and (mono or di)alkylaminoalkylmethacrylate; polymers with nitrogen-containing heterocyclic groups (including but not limited to pyridine, pyrimidine, imidazole, tetrazole, pyrazine, quinoline, isoquinoline, indole, isoindole, benzimidazole, purine, pyrrole, pyrazole, quinazoline, pyridazine, pyrazine, cinnoline, phthalazine, quinoxaline, xanthine, hypoxanthine, and pteridine); amides including formamide, acetamide, acrylamide, polymers and copolymers of acrylamide, and cyclic amides such as caprolactam; pyrollidone; polyvinyl pyrollidone; copolymers of vinyl pyrollidone; methacrylamide; polymethacrylamide; copolymers of methacrylamide; ammonia; guanidine; hydroxyurea; semicarbazide; and mono-, di-, or tri(alkyl or aryl)urea. See, pages 8-37 through 8-39 in the "CRC Handbook of Chemistry and Physics," 72nd Edition, CRC Press, (1992), hereby incorporated by reference. Especially interesting weak bases include nitrogenous bases.

Particular examples of urea hydrochloride analogs include salts of urea formed with any of the strong acids listed above, i.e., nitric acid, hydrochloric acid, hydrobromic acid, hydroiodic acid, hydrofluoric acid, formic acid, acetic acid, hydroxyacetic acid and thioglycolic acid.

Still other particular examples include the HCl, HI, HBr, and HF salts of pyrollidone or polyvinylpyrollidone.

The amount of urea hydrochloride or analog that can be included in the treating compositions of this invention can vary widely, and essentially any amount can be used. In general, the amount to use in a particular application of this invention should be enough to effect preliminary cure of the weatherproofing emulsion coating to which it is applied in a reasonable time frame, but not so much as to adversely affect the properties of the cured weatherproofing polymer made therefrom. Urea hydrochloride is almost as strong as hydrochloric acid, and so chemists familiar with using hydrochloric acid can easily determine how much urea hydrochloride or analog to use for this purpose by routine experimentation.

Also, it should be appreciated that the urea hydrochloride or analog used in the inventive treating composition can be previously formed, or formed in situ if desired. In other words, rather than forming the inventive treating composition by mixing previously-formed urea hydrochloride or analog with the liquid vehicle of the composition, the components forming the urea hydrochloride or analog can be separately added to the liquid vehicle for forming this ingredient in situ.

Liquid Vehicle

In addition to the urea hydrochloride or analog, the inventive treating solution also includes a liquid vehicle in which the urea hydrochloride or analog is dissolved. Water can be used for this purpose, if desired. However, in accordance with one aspect of this invention, an organic solvent at least partially miscible with water is used for this purpose.

In prior approaches for accelerating preliminary cure, water is used as the delivery vehicle for delivering HCl as the active ingredient. However, the still-wet weatherproofing emulsion coating being treated is already heavily laden with water, and so applying still-additional amounts of water increases the amount of water that must be removed. In accordance with this feature of the invention, this problem is avoided by using an organic solvent at least partially miscible with water as the liquid vehicle. The overall water content of the system is not increased (or at least increased significantly) by this approach, whereby additional time for evaporation of the added water is not needed. Moreover, the organic solvent may actually contribute to removal of water in some instances.

For example, ethanol and isopropanol form azeotropes with water and hence may affect the way water evaporates from the weatherproofing emulsion coatings treated in accordance with this invention. Therefore, ethanol, isopropanol or other organic liquid which forms an azeotrope with water can be used in lieu of water for its beneficial effect on the way water evaporates from the weatherproofing emulsion coating.

Essentially any organic solvent which is at least partially miscible with water can be used for this purpose. In this context, "partially miscible with water" means that the organic solvent will dissolve in water in concentrations up to at least 50 wt. % organic solvent, based on combined weight of the solvent and the water. Organic solvents which are miscible (i.e., capable of dissolving in water in any concentration) are even more interesting.

Suitable solvents for this purpose include monohydric or polyhydric alcohols as well as their ethers and esters. Specific examples include methanol, ethanol, propanol, isopropanol, butanol, isobutanol; dihydric or trihydric alcohols, particularly of 2 to 6 carbon atoms, e.g., ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; and lower alkyl ethers of polyhydric alcohols, such as ethylene glycol monomethyl, monoethyl or monobutyl ether, and triethylene glycol monomethyl or monoethyl ether.

Additional suitable solvents for this purpose include ketones and ketone alcohols such as acetone, methyl ethyl ketone, diethyl ketone, methyl isobutyl ketone, methyl pentyl ketone, cyclopentanone, cyclohexanone, diacetone alcohol and butanone; amides such, as dimethylformamide, dimethylacetamide, N-methylpyrrolidone; acetals such as di(lower alkyl) acetals of lower alkyl aldehydes such as acetaldehyde diethyl acetal; lactams; lactones and the like.

Mixtures of these solvents can also be used, either alone or together with water.

$C_1$-$C_4$ alcohols, acetone, methyl ethyl ketone, ethylene glycol, propylene glycol and tetrahydrofuran are especially interesting.

When an organic solvent is used, it will normally be present in the liquid vehicle in a concentration of at least about 10 wt. %, based on the total weight of the treating composition. Concentrations on the order of at least about 20 wt. %, at least about 25 wt. %, at least about 50 wt. %, at least about 75 wt. %, and even at least about 90 wt. %, are more interesting. Similarly, treating compositions containing at least about 10 wt. %, at least about 20 wt. %, at least about 25 wt. %, at least about 50 wt. %, at least about 75 wt. %, and even at least about 90 wt. %, water are also of significant interest.

Compositions of particular interest contain about 2-25 wt. %, about 4-20 wt. %, about 6-15 wt. % or about 8-12 wt. % urea hydrochloride or analog, based on the total weight of the liquid treating compositions. Such compositions which contain a mixture of an organic solvent and water in which the weight ratio of the organic solvent to the water ranges from about 25:1 to about 1:1, more commonly about 20:1 to 4:1, or about 18:1 to about 8:1 or about 15:1 to about 10:1 are even more interesting, especially those in which the organic solvent is methanol, ethanol or isopropanol. A composition containing about 10 wt. % urea HCl, about 7 wt. % water and about 83 wt. % isopropanol is especially interesting.

Treatment of the Polymer Emulsion Coating

In order to effect preliminary cure of a polymer emulsion coating according to this invention, the coating to be treated is simply contacted with the inventive treating composition. This can be done in any way, but is most commonly and easily done by spraying.

Although only a few embodiments of the present invention have been described above, it should be appreciated that many modifications can be made without departing from the spirit and scope of the invention. For example, rather than applying the inventive treating composition to the aqueous polymer emulsion coating only once, the inventive treating composition can be applied multiple times and/or in multiple steps, if desired. For example, applying the aqueous polymer emulsion coating in multiple layers followed by applying the inventive treating composition to one or more these individual layers before the next layer is applied can remarkably shorten the time it takes an aqueous polymer emulsion coating of a particular thickness to dry and cure even more. Thus, an acrylic weatherproofing emulsion coating which normally takes two days to cure can be cured in as little as a half hour following this approach. Applying the inventive treating composition to the substrate to be weatherproofed can also speed drying and curing, especially if the substrate is relatively porous as in the case of the fiberglass substrates discussed above. All such modifications are intended to be included within the scope of the present invention, which is to be limited only by the following claims.

The invention claimed is:

1. A process for accelerating preliminary cure of a polymer coating formed when an aqueous polymer emulsion is applied to an insulating board or sheet attached to the foundation or other structural member of a building, the process comprising contacting the polymer coating after it has been applied but before it achieves preliminary cure with a sufficient amount of a treating composition to cause preliminary cure of the polymer coating, the treating composition comprising urea hydrochloride, an analog of urea hydrochloride or both dissolved in a liquid vehicle comprising an organic solvent at least partially miscible with water, water or both.

2. The process of claim 1, wherein the treating composition consists essentially of urea hydrochloride, an analog of urea hydrochloride or both dissolved in a liquid vehicle comprising an organic solvent at least partially miscible with water, water or both.

3. The process of claim 1, wherein the analog of urea hydrochloride is a salt of a strong acid comprising one or more of nitric acid, hydrochloric acid, hydrobromic acid, hydroiodic acid, hydrofluoric acid, formic acid, acetic acid, hydroxyacetic acid and thioglycolic acid, and a weak base comprising one or more of alkanolamines, alkylamines, dialkylamines, alkyldiamines, alkyltriamines, alkyltetramines, and trialkylamines, polymers with amino or (alkyl or aryl)amino substituent groups, polymers with nitrogen-containing heterocyclic groups, amides, polymers of acrylamide, cyclic amides, pyrrolidone, polyvinyl pyrrolidone, copolymers of vinyl pyrrolidone, methacrylamide, polymethacrylamide, copolymers of methacrylamide, ammonia, guanidine, hydroxyurea, semicarbazide, mono-, di-, or tri(alkyl or aryl)urea, O-methyl hydroxyl amine, aniline and hydrazine.

4. The process of claim 3, wherein the weak base is urea.

5. The process of claim 1, wherein the liquid vehicle contains water.

6. The process of claim 5, wherein the liquid vehicle also includes an organic solvent comprising a monohydric or polyhydric alcohol, an ether of a monohydric or polyhydric alcohol, an ester of a monohydric or polyhydric alcohol, a ketone, an amide, an acetal, a lactam, a lactone, or a mixture of two or more of the foregoing organic solvents.

7. The process of claim 6, wherein the organic solvent is a $C_1$-$C_4$ alcohol, acetone, methyl ethyl ketone, ethylene glycol, propylene glycol or a mixture thereof.

8. The process of claim 1, wherein a portion of the treating composition is applied to the insulation board or sheet prior to the application of the aqueous polymer emulsion to the insulation board or sheet.

9. The process of claim 1, wherein the polymer coating is 10-80 mils thick.

10. A process for accelerating preliminary cure of a polymer coating formed when an aqueous acrylic polymer emulsion stabilized with an anionic surfactant is applied to a substrate comprising an insulating board or sheet attached to the foundation or other structural member of a building, the process comprising contacting the polymer coating after it has been applied but before it achieves preliminary cure with a sufficient amount of a treating composition to cause preliminary cure of the polymer coating, the treating composition comprising urea hydrochloride, an analog of urea hydrochloride or both dissolved in a liquid vehicle comprising an organic solvent at least partially miscible with water, water or both.

11. The process of claim 10, wherein the treating composition consists essentially of urea hydrochloride, an analog of urea hydrochloride or both dissolved in a liquid vehicle comprising an organic solvent at least partially miscible with water, water or both.

12. The process of claim 11, wherein the treating composition consists of urea hydrochloride, an analog of urea hydrochloride or both dissolved in a liquid vehicle comprising an organic solvent at least partially miscible with water, water or both.

13. The process of claim 11, wherein the analog of urea hydrochloride is a salt of a strong acid comprising one or more of nitric acid, hydrochloric acid, hydrobromic acid, hydroiodic acid, hydrofluoric acid, formic acid, acetic acid, hydroxyacetic acid and thioglycolic acid, and a weak base comprising one or more of alkanolamines, alkylamines, dialkylamines, alkyldiamines, alkyltriamines, alkyltetramines, and trialkylamines, polymers with amino or (alkyl or aryl)amino substituent groups, polymers with nitrogen-containing heterocyclic groups, amides, polymers of acrylamide, cyclic amides, pyrrolidone, polyvinyl pyrrolidone, copolymers of vinyl pyrrolidone, methacrylamide, polymethacrylamide, copolymers of methacrylamide, ammonia, guanidine, hydroxyurea, semicarbazide, mono-, di-, or tri(alkyl or aryl)urea, O-methyl hydroxyl amine, aniline and hydrazine.

14. The process of claim 13, wherein the weak base is urea.

15. The process of claim 11, wherein the liquid vehicle contains water.

16. The process of claim 15, wherein the liquid vehicle also includes an organic solvent comprising a monohydric or polyhydric alcohol, an ether of a monohydric or polyhydric alcohol, an ester of a monohydric or polyhydric alcohol, a ketone, an amide, an acetal, a lactam, a lactone, or a mixture of two or more of the foregoing organic solvents.

17. The process of claim 16, wherein the organic solvent is a $C_1$-$C_4$ alcohol, acetone, methyl ethyl ketone, ethylene glycol, propylene glycol or a mixture thereof.

18. The process of claim 11, wherein the treating composition consists essentially of urea hydrochloride, water and an organic solvent comprising a $C_1$-$C_4$ alcohol, acetone, methyl ethyl ketone, ethylene glycol, propylene glycol or mixture thereof.

19. The process of claim 18, wherein the treating composition contains about 2 to about 25 wt. % urea hydrochloride based on the weight of the treating composition and further wherein the weight ratio of organic solvent to water ranges from about 25:1 to about 1:1.

20. The process of claim 11, wherein the aqueous polymer emulsion is applied to the substrate multiple times to form multiple, individual polymer coatings and further wherein the treating composition is applied to one or more of these individual polymer coatings.

21. The process of claim 11, wherein at least a portion of the treating composition is applied to the insulation board or sheet prior to the application of the aqueous polymer emulsion to the insulation board or sheet.

22. The process of claim 11, wherein the polymer coating is 10-80 mils thick.

23. A process for accelerating preliminary cure of a polymer coating formed when an aqueous polymer emulsion is applied to a substrate, the process comprising contacting the polymer coating after it has been applied but before it achieves preliminary cure with a sufficient amount of a treating composition to cause preliminary cure of the polymer coating, the treating composition consisting essentially of urea hydrochloride, water and an organic solvent comprising a $C_1$-$C_4$ alcohol, acetone, methyl ethyl ketone, ethylene glycol, propylene glycol or a mixture thereof.

24. The process of claim 23, wherein the treating composition contains about 2 to about 25 wt. % urea hydrochloride based on the weight of the treating composition and further wherein the weight ratio of organic solvent to water ranges from about 25:1 to about 1:1.

25. A process for accelerating preliminary cure of a polymer coating formed when an aqueous polymer emulsion is applied to a substrate, the process comprising contacting the polymer coating after it has been applied but before it achieves preliminary cure with a sufficient amount of a treating composition to cause preliminary cure of the polymer coating, the treating composition comprising urea hydrochloride, an analog of urea hydrochloride or both dissolved in a liquid vehicle comprising an organic solvent at least partially miscible with water, water or both, wherein the aqueous polymer emulsion is applied to the substrate multiple times to form multiple, individual polymer coatings and further wherein the treating composition is applied to one or more of these individual polymer coatings.

* * * * *